(12) United States Patent
Toma et al.

(10) Patent No.: US 12,261,291 B2
(45) Date of Patent: Mar. 25, 2025

(54) POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

(71) Applicant: SUMITOMO METAL MINING CO., LTD., Tokyo (JP)

(72) Inventors: Takahiro Toma, Ehime (JP); Takahiro Ogawa, Ehime (JP); Yoshiyuki Matsuura, Ehime (JP); Kazuomi Ryoshi, Ehime (JP)

(73) Assignees: SUMITOMO METAL MINING CO., LTD., Tokyo (JP); Panasonic Energy Co., Ltd., Osaka (JP)

(*) Notice: Subject to any disclaimer, the term of this patent is extended or adjusted under 35 U.S.C. 154(b) by 806 days.

(21) Appl. No.: 17/310,782

(22) PCT Filed: Feb. 26, 2020

(86) PCT No.: PCT/JP2020/007758
§ 371 (c)(1),
(2) Date: Aug. 24, 2021

(87) PCT Pub. No.: WO2020/175554
PCT Pub. Date: Sep. 3, 2020

(65) Prior Publication Data
US 2022/0131141 A1    Apr. 28, 2022

(30) Foreign Application Priority Data
Feb. 26, 2019    (JP) ................................. 2019-033321

(51) Int. Cl.
*H01M 4/505*    (2010.01)
*H01M 4/04*    (2006.01)
(Continued)

(52) U.S. Cl.
CPC ......... *H01M 4/505* (2013.01); *H01M 4/0471* (2013.01); *H01M 4/525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,768,446 B2 | 9/2017 | Nagai et al. | |
| 2015/0207147 A1* | 7/2015 | Nagai | H01M 10/0567 429/231.95 |

(Continued)

FOREIGN PATENT DOCUMENTS

| | | |
|---|---|---|
| CN | 104428942 | 3/2015 |
| JP | 2008-282667 | 11/2008 |

(Continued)

OTHER PUBLICATIONS

International Search Report mailed on May 26, 2020 with respect to No. PCT/JP2020/007758.

(Continued)

*Primary Examiner* — Wyatt P McConnell
(74) *Attorney, Agent, or Firm* — IPUSA, PLLC (57) ABSTRACT

A positive electrode active material for a lithium ion secondary battery contains a lithium metal composite oxide. The lithium metal composite oxide includes lithium (Li), nickel (Ni), cobalt (Co), and element M (M) in a mass ratio of Li:Ni:Co:M=1+a:1−x−y:x:y (wherein −0.05≤a≤0.50, 0≤x≤0.35, 0≤y≤0.35, and the element M is at least one element selected from Mg, Ca, Al, Si, Fe, Cr, Mn, V, Mo, W, Nb, Ti, Zr, and Ta), wherein when a line analysis is performed with STEM-EELS from a surface of a particle of the lithium metal composite oxide to a center of the particle in a cross-section of the particle during charging at 4.3 V (vs.

(Continued)

Li$^+$/Li), a thickness of an oxygen release layer, in which an intensity ratio of a peak near 530 eV (1st) to a peak near 545 eV (2nd) at an O-K edge is 0.9 or less, is 200 nm or less.

9 Claims, 5 Drawing Sheets

(51) Int. Cl.
*H01M 4/525* (2010.01)
*H01M 4/02* (2006.01)

(56) References Cited

U.S. PATENT DOCUMENTS

| | | |
|---|---|---|
| 2018/0215629 A1 | 8/2018 | Honma et al. |
| 2018/0226647 A1 | 8/2018 | Tsujiko |
| 2019/0267613 A1 | 8/2019 | Kageura et al. |

FOREIGN PATENT DOCUMENTS

| | | |
|---|---|---|
| JP | 2011-008950 | 1/2011 |
| JP | 2014-011065 | 1/2014 |
| JP | 2016-095934 | 5/2016 |
| JP | 2016-204239 | 12/2016 |
| JP | 2018-073687 | 5/2018 |
| JP | 2018-129228 | 8/2018 |

OTHER PUBLICATIONS

Decai Yang, "Safety of Lithium-Ion Battery—Principles, Design and Testing", May 2012, pp. 66-67, ISBN 978-7-5647-1147-4, with partial English translation.

Reiner Korthauer, "Handbook of Lithium-Ion Battery", Translation from German Language Edition: Handbuch Lithium-Ionen-Batterien, May 2018, pp. 220-221, ISBN 978-7-111-59536-6, with partial English translation.

* cited by examiner

POSITIVE ELECTRODE ACTIVE MATERIAL FOR LITHIUM ION SECONDARY BATTERY, METHOD OF MANUFACTURING POSITIVE ELECTRODE ACTIVE MATERIAL FOR LITHIUM ION SECONDARY BATTERY, AND LITHIUM ION SECONDARY BATTERY

TECHNICAL FIELD

The present invention relates to a positive electrode active material for a lithium ion secondary battery, a method of manufacturing a positive electrode active material for a lithium ion secondary battery, and a lithium ion secondary battery.

BACKGROUND OF THE INVENTION

In recent years, with the spread of portable electronic devices such as cellular phones and notebook PCs, there is a strong need for the development of small, lightweight, non-aqueous electrolyte secondary batteries with high energy density. There is also a strong need for the development of secondary batteries with excellent capacity density as batteries for electric-mortar car (xEV) such as electric vehicles, various hybrid vehicles, fuel cell vehicles, and other electric vehicles.

Lithium ion secondary batteries have been proposed as secondary batteries that satisfy such requirements. A lithium ion secondary battery is configured by, for example, a negative electrode, a positive electrode, an electrolyte, or the like. Active materials of the negative electrode and the positive electrode are materials that can intercalate and de-intercalate lithium ions.

Such lithium ion secondary batteries are currently being extensively researched and developed. Among them, lithium ion secondary batteries that use layered or spinel-type lithium metal oxide as a positive electrode material obtain high voltages of the 4V class, and hence are being commercialized as batteries with high energy density.

Examples of materials, that have been mainly proposed, include a lithium-cobalt composite oxide ($LiCoO_2$), which is relatively easy to synthesize, a lithium-nickel composite oxide ($LiNiO_2$), which uses nickel that is less expensive than cobalt, a lithium-nickel-cobalt-manganese composite oxide ($LiNi_{1/3}Co_{1/3}Mn_{1/3}O_2$), and a lithium-manganese composite oxide ($LiMn_2O_4$), which use manganese.

In order to obtain a lithium ion secondary battery with high energy density, a positive electrode active material must have high charge and discharge capacity. It is known that increasing a ratio of nickel (Ni) of the positive electrode active material is effective to increase the battery capacity. Nickel has a lower electrochemical potential than cobalt or manganese, and the change in transition metal number contributing to charge and discharge is increased, and the charge and discharge capacity is increased. Increasing the ratio of nickel, however, reduces the thermal stability. Accordingly, methods for increasing thermal stability have been studied in the past, and methods have been known in which a highly thermostable positive electrode material, such as a lithium-manganese composite oxide, is mixed with a lithium-nickel composite oxide to ensure thermal stability.

Patent Document 1 discloses a positive electrode active material in which a nickel-lithium composite oxide having a predetermined composition and a lithium-manganese composite oxide are mixed in a ratio (mass ratio) of 80:20 to 90:10.

RELATED-ART DOCUMENT

Patent Document

Patent Document 1: Japanese Patent Application Laid-Open No. 2008-282667

SUMMARY OF THE INVENTION

Problems to be Solved by the Invention

However, there was a problem that it was intrinsically difficult to increase the energy density in the method of mixing two-composition particles, such as the positive electrode active material disclosed in Patent Document 1.

It is believed that thermal stabilities of positive electrode active materials for lithium ion secondary batteries decrease because the structure of the active materials for the lithium ion secondary batteries become unstable due to lithium de-intercalation by charging the positive electrode active materials for lithium ion secondary batteries, and oxygen released from the positive electrode active materials for the lithium ion secondary batteries and organic matter contained in the electrolytes or the like undergo exothermic reactions. For this reason, there has been a need for a positive electrode active material for a lithium ion secondary battery that could suppress oxygen release when the battery is charged.

Accordingly, in view of the above-described problems in the prior art, an object of the present invention is to provide a positive electrode active material for a lithium ion secondary battery in which oxygen release in a charging state is suppressed.

Means for Solving the Problems

According to one aspect of the present invention in order to solve the above problems, there is provision of a positive electrode active material for a lithium ion secondary battery containing a lithium metal composite oxide, the lithium metal composite oxide including lithium (Li), nickel (Ni), cobalt (Co), and element M (M) in a mass ratio of Li:Ni:Co:M=1+a:1−x−y:x:y (wherein −0.05≤a≤0.50, 0≤x≤0.35, 0≤y≤0.35, and the element M is at least one element selected from Mg, Ca, Al, Si, Fe, Cr, Mn, V, Mo, W, Nb, Ti, Zr, and Ta), wherein when a line analysis is performed with STEM-EELS from a surface of a particle of the lithium metal composite oxide to a center of the particle in a cross-section of the particle during charging at 4.3 V (vs. $Li^+$/Li), a thickness of an oxygen release layer, in which an intensity ratio (1st/2nd) of a peak near 530 eV (1st) to a peak near 545 eV (2nd) at an O-K edge is 0.9 or less, is 200 nm or less, and wherein a specific surface area of the positive electrode active material for a lithium ion secondary battery is 0.7 $m^2$/g or more and 2.0 $m^2$/g or less.

Effects of the Invention

According to an aspect of the present invention, a positive electrode active material for a lithium ion secondary battery that suppresses oxygen release in a charging state can be provided.

DETAILED DESCRIPTION OF THE INVENTION

While embodiments of the present invention will now be described with reference to the accompanying drawing, the present invention is not limited to the following embodiments, and various modifications and substitutions can be made to the following embodiments without departing from the scope of the present invention.

Positive Electrode Active Material for Lithium Ion Secondary Battery

The positive electrode active material for the lithium ion secondary battery according to the present embodiment (hereinafter, also referred to as "positive electrode active material") can contain a lithium metal composite oxide.

The lithium metal composite oxide can contain lithium (Li), nickel (Ni), cobalt (Co), and an element M (M) in a mass ratio of Li:Ni:Co:M=1+a:1−x−y:x:y. In the above-described formula, a, x, and y preferably satisfy −0.05≤a≤0.50, 0≤x≤0.35, and 0≤y≤0.35, respectively. The element M may be at least one element selected from Mg, Ca, Al, Si, Fe, Cr, Mn, V, Mo, W, Nb, Ti, Zr, and Ta.

Then, when a line analysis is performed with STEM-EELS from a surface to a center of particles in the cross-section of the particles of the lithium metal composite oxide during charging at 4.3 V (vs. Li$^+$/Li), a thickness of an oxygen release layer, in which an intensity ratio (1st/2nd) of a peak near 530 eV (1st) and a peak near 545 eV (2nd) at an O-K edge is to be 0.9 or less, can be adjusted to 200 nm or less. In addition, a specific surface area can be 0.7 m$^2$/g or more and 2.0 m$^2$/g or less.

The inventors of the present invention thoroughly investigated powder characteristics of the lithium metal composite oxide used as the positive electrode active material to suppress an oxygen release in a charging state and the effect on the positive electrode resistance of the battery.

As a result, the inventors found that, in some cases, the oxygen release layer that easily releases oxygen may have been formed on the particle surface of a lithium metal composite oxide during charging, and that there was a correlation between a thickness of the oxygen release layer and an amount of oxygen released from the positive electrode active material during charging. Furthermore, the inventors found that controlling particle characteristics and keeping the specific surface area within a predetermined range to allow the electrochemical reaction to occur uniformly suppressed oxygen release and provided high thermal stability because the oxygen release layer is the layer formed by the particles with excessive Li de-intercalation due to the unevenness of the electrochemical reaction between particles in the electrode. Therefore, the present invention has been completed based on the finding that the oxygen release is suppressed in a charging state and the thermal stability is improved by suppressing the thickness of the oxygen release layer on the particle surface of the contained lithium metal composite oxide to make a positive electrode active material that has predetermined particle characteristics.

The positive electrode active material of the present embodiment can contain a lithium metal composite oxide as described above. The positive electrode active material of the present embodiment can also be composed of a lithium metal composite oxide.

The lithium metal composite oxide can contain lithium (Li), nickel (Ni), cobalt (Co), and an element M (M) in a mass ratio of Li:Ni:Co:M=1+a:1−x−y:x:y. In the above-described formula, a, x, and y preferably satisfy −0.05≤a≤0.50, 0≤x≤0.35, and 0≤y≤0.35, respectively.

As described above, the value of a, which indicates an excess amount of lithium (Li), is preferably −0.05 or more and 0.50 or less, more preferably 0 or more and 0.20 or less, and even more preferably 0 or more and 0.10 or less.

When the value of a is set to −0.05 or more and 0.50 or less, the output characteristics and the battery capacity of the secondary battery using the positive electrode active material containing the lithium metal composite oxide as the positive electrode material can be improved. With respect to the above, when the value of a is set to less than −0.05, the output characteristics may not be sufficiently improved because the positive electrode resistance of the secondary battery is increased. In contrast, when the value of a exceeds 0.50, the initial discharge capacity may be decreased and the positive electrode resistance may be increased.

As described above, the value of x indicating a cobalt content can be set to 0 or more and 0.35 or less. However, when the nickel content is particularly needed to be high, the value of x can be adjusted so that the cobalt content is to be low, for example, 0 or more and 0.20 or less.

When the positive electrode active material containing the lithium metal composite oxide is used for a secondary battery, the lithium metal composite oxide may contain an element M, which is an additive element other than lithium, nickel, and cobalt, in order to further improve the durability and output characteristics of the secondary battery. As the element M, one or more elements selected from magnesium (Mg), calcium (Ca), aluminum (Al), silicon (Si), iron (Fe), chromium (Cr), manganese (Mn), vanadium (V), molybdenum (Mo), tungsten (W), niobium (Nb), titanium (Ti), zirconium (Zr), and tantalum (Ta) may be used.

The value of y indicating a content of the element M is preferably 0 or more and 0.35 or less, more preferably 0 or more and 0.10 or less, and even more preferably 0.001 or more and 0.05 or less. When the value of y is 0.35 or less, the metal element that contributes to a Redox reaction can be sufficiently secured and the battery capacity can be sufficiently increased. In addition, the element M may be set to 0 or more because the element M is not needed to be added.

The element M may be uniformly dispersed within the secondary particles of lithium metal composite oxide contained in the positive electrode active material, or may be coated on the surfaces of the secondary particles of lithium metal composite oxide. Further, the secondary particles of the lithium metal composite oxide may be uniformly dispersed within the secondary particles, in addition to that, the element M may be coated on the surfaces of the secondary particles of the lithium metal composite oxide. That is, the element M is preferably either uniformly distributed within the secondary particles of lithium metal composite oxide or uniformly coated on the surfaces of the secondary particles, or both.

Note that, even if the element M is included in the lithium metal composite oxide in any manner, the amount added of the element M is preferably controlled to satisfy the above-described range.

The lithium metal composite oxide in the present embodiment can be represented, for example, by the general formula: $Li_{1+a}Ni_{1-x-y}Co_xM_yO_{2+z}$. The description of a, x, and y in the above-described general formula is omitted here because the description of a, x, and y is explained above. In addition, z is preferably, for example, $0 \leq z \leq 0.10$.

The positive electrode active material of the present embodiment can contain primary particles or secondary particles formed by aggregation of a plurality of the primary particles. The positive electrode active material of the present embodiment can also be composed of the secondary particles formed by aggregation of a plurality of primary particles.

Note that, such primary particles or secondary particles may be particles of, for example, a lithium metal composite oxide.

In addition, in the positive electrode active material of the present embodiment, the thickness of the oxygen release layer, in which the thickness is determined by observing particles of the lithium metal composite oxide during charging at 4.3 V (vs. $Li^+/Li$) by Scanning Transmission Electron Microscope-Electron Energy-Loss Spectroscopy (STEM-EELS), is preferably 200 nm or less.

As described above, according to the inventors of the present invention, the oxygen release layer may be formed on the surface of particles of the lithium metal composite oxide during charging, and there is a correlation between the thickness of the oxygen release layer and the amount of oxygen released from the positive electrode active material during charging. For a thickness of the oxygen release layer, when particles of the lithium metal composite oxide during charging at 4.3 V (vs. $Li^+/Li$) are observed by STEM-EELS, that is 200 nm or less, the particles of the lithium metal composite oxide can be used as positive electrode active material that sufficiently suppress the amount of oxygen released from the positive electrode active material during charging. In other words, the positive electrode active material can be formed to have excellent thermal stability.

Further, the thickness of the oxygen release layer, when particles of the lithium metal composite oxide during charging at 4.3 V (vs. Li+/Li) are observed by STEM-EELS, is preferably 100 nm or less and more preferably 50 nm or less.

The thickness of the oxygen release layer on the particle surface of lithium metal composite oxide during charging can be evaluated by observation using STEM-EELS. Specifically, particles of lithium metal composite oxide in which the size of the secondary particles is smaller than the mean volume particle diameter of the positive electrode active material, then, the oxygen release layer can be easily observed using STEM-EELS. For example, lithium metal composite oxide particles whose secondary particle size is ⅔ or less of the mean volume particle diameter of the positive electrode active material are selected, and the cross-sectional structure was observed. In the cross-section of the particle, spectra by EELS can be measured from the surface of the particle to the center of the particle at regular intervals along the diameter direction, and the thickness of the oxygen release layer can be determined by measuring the thickness from the particle surface in the layer where the intensity ratio (1st/2nd) of the peak near 530 eV (1st) and the peak near 545 eV (2nd) at the O-K edge is to be 0.9 or less.

The peak near 530 eV (1st) represents a compound of $LiNiO_2$ or $LiNiO_2$ skeleton structure, whereas the peak near 545 eV (2nd) represents NiO skeleton structure. According to the inventors of the present invention, the oxygen release layer in which the ratio of the intensity of the 1st peak to the intensity of the 2nd peak representing NiO being 0.9 or less is a layer having a low ability to retain oxygen. By setting the thickness of the layer to 200 nm or less, the amount of oxygen released can be suppressed even when the temperature rises, and the thermal stability can be improved.

The specific surface area of the positive electrode active material of the present embodiment is preferably 0.7 $m^2/g$ or more and 2.0 $m^2/g$ or less and more preferably 0.8 $m^2/g$ or more and 1.7 $m^2/g$ or less.

By setting the specific surface area of the positive electrode active material to the above-described range, the contact area with the electrolyte can be sufficiently increased, and the reaction field in which the intercalation reaction of Li ions occurs can be widened. This reduces the local excessive de-intercalation of lithium, particularly inhibits oxygen release, and particularly enhances thermal stability.

Specifically, by setting the specific surface area of the positive electrode active material to 0.7 $m^2/g$ or more, the electrochemical reaction field can be sufficiently secured, and the occurrence of particles with the local excessive de-intercalation of lithium can be suppressed. Thereby, the thermal stability can be increased. In addition, when the specific surface area of the positive electrode active material is set to be 2.0 $m^2/g$ or less, an excessively high reactivity with the electrolyte can be suppressed, and the thermal stability particularly can be enhanced.

The specific surface area of the positive electrode active material can be measured by, for example, the BET method by nitrogen gas absorption.

The particle size contained in the positive electrode active material of the present embodiment is not particularly limited. However, in the particle size distribution by the laser diffraction scattering method, the mean volume particle diameter (MV) is preferably 5 μm or more and 20 μm or less, more preferably 7 μm or more and 20 μm or less, and even more preferably 7 μm or more and 15 μm or less.

When the mean volume particle diameter (MV) of the positive electrode active material is set to the above-described range, not only the battery capacity per unit volume of the secondary battery using the positive electrode active material can be increased, but also the thermal stability and the output characteristics can be especially increased.

For example, when the mean volume particle diameter (MV) is set to 5 μm or more, the filling ability of the positive electrode active material can be increased and the battery capacity per unit volume can be increased. In addition, when the mean volume particle diameter (MV) is set to 20 μm or less, the reaction area of the positive electrode active material can be increased, and the interface with the electrolyte can be increased, thereby increasing the output characteristics.

The mean volume particle diameter (MV) of the positive electrode active material indicates the mean volume particle diameter (MV) based on the volume. For example, the mean volume particle diameter can be determined from the cumulative volume measured by a laser light diffraction scattering particle size analyzer.

In addition, in the positive electrode active material of the present embodiment, [(d90−d10)]/mean volume particle diameter] which is an index indicating the spread of the particle size distribution is preferably 0.80 or more, more preferably 0.85 or more, and even more preferably 0.90 or more.

By setting the above index to 0.80 or more, the positive electrode active material can be composed of particles with a wide range of the particle size distribution. Such positive electrode active material has an excellent filling ability, and the secondary battery using the positive electrode active material has an excellent energy density.

The upper limit of the above-described index is not particularly limited, but preferably, for example, 1.25 or less, more preferably 1.20 or less, and even more preferably 1.00 or less.

In addition to the aforementioned specific surface area of the positive electrode active material, the spread of the particle size distribution can be set to the aforementioned range, so that the formation of the oxygen release layer during charging particularly can be suppressed.

The d10 means the cumulative 10% particle size, which means the particle size at the cumulative volume of 10% in the particle size distribution determined by the laser diffraction scattering method. The d90 means the cumulative 90% particle size, which means the particle size at the cumulative volume of 90% in the particle size distribution determined by the laser diffraction scattering method.

In addition, a tap density of the positive electrode active material of the present embodiment is not particularly limited, and can be arbitrarily selected according to the performance required. However, increasing the capacities of lithium ion secondary batteries have become an important issue in order to increase the operating hours of portable electronic devices and the running distance of electric vehicles. In contrast, the thickness of the electrode of lithium ion batteries must be several microns due to the packing and electronic conductivity of the entire battery. Therefore, it is required not only to use a high-capacity positive electrode active material, but also to improve the filling ability of the positive electrode active material and to increase the capacity of the lithium ion secondary batteries as a whole.

From this view point, in the positive electrode active material of the present embodiment, the tap density, which is an index of filling ability, is preferably 2.0 g/cm$^3$ or more and more preferably 2.2 g/cm$^3$ or more.

When the tap density is set to 2.0 g/cm$^3$ or more, the filling ability can be particularly increased, and the battery capacity of the entire lithium ion secondary battery can be particularly increased. In contrast, the upper limit of the tap density is not particularly limited, but the upper limit under normal manufacturing conditions is about 3.0 g/cm$^3$. Therefore, the tap density is preferably 3.0 g/cm$^3$ or less.

The tap density refers to a bulk density of a sample powder collected into a container after 100 taps in accordance with JIS Z 2504 (2012), and can be measured using a shaking specific gravity meter.

Method of Manufacturing Positive Electrode Active Material for Lithium Ion Secondary Battery Next, a method of manufacturing a positive electrode active material for a lithium ion secondary battery of the present embodiment will be described.

A method of manufacturing a positive electrode active material for a lithium ion secondary battery of the present embodiment (hereinafter, also referred to as "method of manufacturing a positive electrode active material") may include the following steps.

A heat treatment step is to heat-treat a metal composite hydroxide at 105° C. or higher and 700° C. or lower to obtain a heat-treated metal composite hydroxide.

A mixing step is to mix the heat-treated metal composite hydroxide with a lithium compound to form a lithium mixture.

A firing step is to fire the lithium mixture formed in the mixing step at a temperature of 650° C. or higher and 900° C. or lower under an oxidizing atmosphere.

The metal composite hydroxide may contain nickel (Ni), cobalt (Co), and the element M (M) in a mass ratio of Ni:Co:M=1−x−y:x:y. However, x and y in the above-described formula preferably satisfy $0 \leq x \leq 0.35$ and $0 \leq y \leq 0.35$. The element M may be at least one element selected from Mg, Ca, Al, Si, Fe, Cr, Mn, V, Mo, W, Nb, Ti, Zr, and Ta.

In addition, the specific surface area of the positive electrode active material obtained after the firing step can be 0.7 m$^2$/g or more and 2.0 m$^2$/g or less.

Hereinafter, a method of manufacturing a positive electrode active material for a lithium ion secondary battery of the present embodiment will be described in detail for each step. The aforementioned positive electrode active material can be manufactured by the method of manufacturing the positive electrode active material of the present embodiment. For this reason, some explanations of the matters already explained will be omitted.

(1) Heat Treatment Step

The method of manufacturing the positive electrode active material of the present embodiment can include a heat treatment step of heat-treating the metal composite hydroxide to form a heat-treated metal composite hydroxide compound. Here, the heat-treated metal composite hydroxide compound obtained by the heat treatment step includes not only the metal composite hydroxide in which the excess water content of the metal composite hydroxide is removed in the heat treatment step, but also the metal composite hydroxide which is converted to the oxide by the heat treatment step and these mixtures.

The conditions of the heat treatment step are not particularly limited, but, for example, the metal composite hydroxide is preferably heated to 105° C. or higher and 700° C. or lower.

By heat-treating the metal composite hydroxide at the above temperature, the excess water content contained in the metal composite hydroxide can be reduced and removed, and the water content residue can be reduced to a certain amount until after the firing step. Therefore, the variation in the composition of the obtained positive electrode active material can be suppressed. In addition, the specific surface area of the positive electrode active material obtained after the firing step can be easily adjusted to the desired range by conducting this heat treatment step and further setting the firing temperature in the firing step described below to a predetermined range.

As described above, the excess water content in the metal composite hydroxide is sufficiently removed by the heat treatment at a temperature of 105° C. or higher, and the variation in the composition of the positive electrode active material obtained after the firing step can be particularly suppressed. However, if the heat treatment temperature is excessively high, exceeding 700° C., there is no significant difference in the effect, and it is preferable to keep the temperature at 700° C. or lower from the view point of reducing cost.

In the heat treatment step, it is not necessarily needed to convert all the metal composite hydroxides to oxides, because it is sufficient to remove water content from the metal composite hydroxides to the extent that no variation in the number of atoms in each metal content or in the ratio of Li atoms in the resulting positive electrode active material after the firing step occurs. However, in order to achieve a smaller variation in the number of atoms of each metal component and the ratio of Li atom, it is preferable to convert all metal composite hydroxides into composite oxides by the heat treatment at 400° C. or higher.

By determining the metal components contained in the heat-treated metal composite compound by heat treatment conditions in advance by analysis and determining the mixing ratio with the lithium compound, the above-mentioned variation can be further suppressed.

The atmosphere in which the heat treatment is performed is not particularly limited and may be a non-reducing atmosphere. However, the atmosphere is preferably performed in an air stream which can be easily performed.

In addition, although the heat treatment time is not particularly limited, the time is preferably at least 1 hour or longer and more preferably 5 hours or longer and 15 hours or shorter from the view point of sufficiently removing the excess water content in the metal composite hydroxide.

The metal composite hydroxide subjected to the heat treatment step may contain nickel (Ni), cobalt (Co), and the element M (M) in a mass ratio of Ni:Co:M=1−x−y:x:y. The descriptions of x, y, and element M have already been explained, therefore, the description will be omitted here. The range of x and y can also have a more preferred range similar to the x and y described for the positive electrode active material.

The metal composite hydroxide can be represented, for example, by the general formula: $Ni_{1-x-y}Co_xM_y(OH)_{2+\alpha}$. The aforementioned x and y in the above formula satisfy the above-described range. In addition, $\alpha$ is preferably $-0.2 \leq \alpha \leq 0.2$.

(2) Mixing Step

In the mixing step, a heat-treated metal composite compound and a lithium compound can be mixed as described above to obtain a lithium mixture.

In the mixing step, the ratio of mixing the heat-treated metal composite compound and the lithium compound is not particularly limited, and the ratio can be freely selected depending on the composition and the like required of the positive electrode active material to be manufactured. For example, the ratio (Li/Me) of the sum of the atomic numbers (Me) of metal atoms other than lithium in the lithium mixture, specifically nickel, cobalt, and element M, obtained in the mixing step and the number of lithium atom (Li) is 0.95 or more and 1.5 or less. Particularly, the heat-treated metal composite compound and the lithium compound are preferably mixed so that the ratio (Li/Me) is 1.0 or more and 1.2 or less and even more preferably 1.0 or more and 1.1 or less.

The ratio Li/Me does not appreciably vary before and after the firing step. Therefore, each raw material is preferably mixed so that the ratio Li/Me of the lithium mixture obtained in the mixing step becomes the ratio Li/Me of the desired positive electrode active material.

The lithium compound used in the mixing step is not particularly limited, but it is preferable to use one or more compounds selected from lithium hydroxide, lithium nitrate, and lithium carbonate from the view point of availability. Lithium hydroxide or lithium carbonate is preferably used, particularly in view of ease of handling and stability of quality.

It is preferable that the heat-treated metal composite compound and the lithium compound are sufficiently mixed to the extent that no fine powder is produced. If mixing is not sufficient, variations in the ratio Li/Me between individual particles may occur, and sufficient battery characteristics may not be obtained. For mixing, a general mixer may be used. For example, a shaker mixer, loedige mixer, Julia mixer, V-blender, and the like can be used.

(3) Firing Step

The firing step is a step of firing the lithium mixture obtained in the mixing step under a predetermined condition and dispersing lithium in the heat-treated metal composite compound to obtain a lithium metal composite oxide.

A furnace used in the firing step is not particularly limited and may be capable of heating the lithium mixture in the atmosphere or in the stream of oxygen. However, from the view point of maintaining a uniform atmosphere in the furnace, an electric furnace that does not generate a gas is preferably used. Both batch-type and continuous-type electric furnaces can be preferably used. The same furnace applies to the aforementioned heat treatment step, and applies to the calcination step which will be described later.

Hereinafter, a suitable firing condition of the firing step will be described.

(3-1) Firing Temperature

The firing temperature of the lithium mixture is preferably 650° C. or higher and 900° C. or lower and more preferably between 650° C. or higher and 850° C. or lower. When the firing temperature is set to 650° C. or higher, lithium can be sufficiently diffused into the heat-treated metal composite compound, and the residual excess lithium and unreacted heat-treated metal composite compound can be suppressed. In addition, the firing temperature of 650° C. or higher is preferably applied because the crystallinity of the resulting lithium metal composite oxide can be increased.

In addition, when the firing temperature is set to 900° C. or lower, severe sintering between particles of the lithium metal composite oxide and generation of abnormal particle growth can be suppressed, thereby the generation of irregular coarse particles can be suppressed.

In addition, by selecting the firing temperature in the firing step within the above-described range, the specific surface area of the obtained positive electrode active material can be adjusted.

The rate of increase in temperature in the firing step is not particularly limited, but the temperature is preferably 2° C./minute or more and 10° C./minute or less and more preferably 3° C./minute or more and 8° C./minute or less.

In addition, the temperature rising is temporarily stopped and preferably held at a temperature near the melting point of the lithium compound during the firing step. In this case, the holding time is preferably 1 hour or longer and 5 hours or shorter and more preferably 2 hours or longer and 5 hours or shorter. The heat-treated metal composite compound and the lithium compound can be reacted more uniformly by stopping the rising of the temperature and keeping the temperature near the melting point of the lithium compound.

(3-2) Firing Time

Within the firing time, the holding time at the firing temperature described above is not particularly limited.

However, the firing time is preferably 2 hours or longer and more preferably 4 hours or longer. When the holding time at the firing temperature is set to 2 hours or longer, lithium can be sufficiently diffused into the metal composite oxide, and the residual excess lithium and unreacted metal composite oxide can be suppressed. In addition, it is preferable that the crystallinity of the resulting lithium metal composite oxide can be increased.

The upper limit of the firing time is not particularly limited, but the firing time is preferably 48 hours or shorter from the view point of productivity.

(3-3) Cooling Rate

Although the cooling rate from the firing temperature after the completion of holding is not particularly limited, for example, the cooling rate from the firing temperature to 200° C. is preferably 2° C./minute or more and 10° C./minute or less and more preferably 3° C./minute or more and 7° C./minute or less. When the cooling rate is set to the above-described range, it is capable of preventing equipment such as a bowl from becoming damaged due to rapid cooling while securing productivity.

(3-4) Atmosphere of Firing

The atmosphere during firing is preferably an oxidizing atmosphere, and the atmosphere has an oxygen concentration of 18% by volume or more and 100% by volume or less. This is because the crystallinity of the resulting lithium metal composite oxide can be particularly enhanced by setting the oxygen concentration to be 18% by volume or more. The remaining portion other than oxygen is not particularly limited, but may be, for example, an inert gas such as nitrogen or noble gas. In addition, carbon dioxide, water vapor, or the like may be included in the remaining portion other than the oxygen. More preferably, the firing is carried out, for example, in the air or in an oxygen stream.

The method of manufacturing the positive electrode active material of the present embodiment may include any step other than the heat treatment step, the mixing step, and the firing step. For example, a calcination step in which the lithium mixture is calcined prior to the firing step or a pulverizing step in which the lithium metal composite oxide obtained after the firing step is pulverized, may be included. Hereinafter, these optional steps will be described.

(4) Calcination Step

When lithium hydroxide or lithium carbonate is used as the lithium compound, a calcination step in which the lithium mixture is calcined after the mixing step and before the firing step is preferably conducted.

Although the calcination temperature in the calcination step is not particularly limited, the calcination temperature is lower than the firing temperature in the firing step. The calcination temperature is preferably 350° C. or higher and 800° C. or lower and more preferably 450° C. or higher and 780° C. or lower.

By performing the calcination step, lithium can be sufficiently diffused into the heat-treated metal composite compound to obtain a more uniform lithium metal composite oxide.

In addition, the holding time at the calcination temperature is preferably 1 hour or longer and 10 hours or shorter and more preferably 3 hours or longer and 6 hours or shorter.

In addition, the atmosphere in the calcination step is preferably the same atmosphere with the atmosphere in the firing step. An oxygen concentration in the atmosphere of the calcination step is more preferably 18% by volume or more and 100% by volume or less.

(5) Pulverizing Step

The lithium metal composite oxide obtained by the firing step may be aggregated or slightly sintered. In such cases, an aggregated or a sintered lithium metal composite oxide is preferably pulverized. This allows the average particle size, particle size distribution, specific surface area, and the like of the obtained positive electrode active material to be adjusted to a suitable range. Meanwhile, pulverizing refers to an operation in which an aggregate consisting of a plurality of secondary particles produced by sintering-neck between secondary particles during firing is subjected to mechanical energy to separate the secondary particles with little destruction, thereby loosening the aggregate.

As a method of pulverizing, known methods can be used, such as pin mills, hammer mills, and the like. At this time, it is preferable to adjust the pulverizing force to an appropriate range so as not to break the secondary particles. In addition, in the pulverizing step, the specific surface area of the obtained positive electrode active material can be adjusted to 0.7 $m^2/g$ or more and 2.0 $m^2/g$ or less. The heat treatment step, the mixing step, and the firing step described above are performed under the above-described conditions. The specific surface area of the positive electrode active material obtained in the pulverizing step is adjusted to within a predetermined range. Thereby, the thickness of the oxygen release layer formed when the obtained positive electrode active material is charging can be particularly suppressed.

Lithium Ion Secondary Battery

The lithium ion secondary battery (hereinafter, also referred to as "secondary battery") of the present embodiment can have a positive electrode that includes the aforementioned positive electrode active material.

Hereinafter, an example of a secondary battery of the present embodiment will be described for each component. The secondary battery in the present embodiment includes, for example, a positive electrode, a negative electrode, and a non-aqueous electrolyte, and is configured by the same components as a general lithium ion secondary battery. It should be noted that the embodiments described below are merely exemplary, and the lithium ion secondary battery of the present embodiment can be implemented in various modified and improved forms based on the knowledge of a person skilled in the art, including the following embodiments. In addition, the secondary battery is not particularly limited with respect to uses thereof.

Positive Electrode

The positive electrode of the secondary battery in the present embodiment can include the positive electrode active material described above.

An example of a method of manufacturing the positive electrode will be described below. First, the aforementioned positive electrode active material (in powder form), a conductive material, and a binding agent (binder) can be mixed to form a positive electrode mixture. If necessary, activated carbon or a solvent for adjusting the viscosity can be added to the positive electrode mixture, followed by kneading to prepare a positive electrode mixture paste.

The mixing ratio of each material in the positive electrode mixture is a determinant of the performance of the lithium secondary battery. Therefore, the mixing ratio can be adjusted depending on the application. The mixing ratio of the materials may be the same as that of a known lithium ion secondary battery. For example, when the total mass of solids of the positive electrode mixture without solvent is 100% by mass, the positive electrode active material may contain 60% by mass or more and 95% by mass or less, the conductive material may contain 1% by mass or more and 20% by mass or less, and the binder may contain 1% by mass or more and 20% by mass or less.

A sheet-like positive electrode is prepared by coating the resulting positive electrode mixture paste, for example, to a surface of an aluminum foil current collector, and the sheet-like positive electrode is dried by evaporating the solvent. If necessary, pressure may be applied by roll press or the like to increase electrode density. The sheet-like positive electrode obtained in this way can be cut into appropriate sizes according to the desired battery, and the sheet-like positive electrode can be used for producing a battery.

As the conductive material, for example, graphite (natural graphite, artificial graphite, expanded graphite, and the like) or carbon black-based material such as acetylene black or Ketchen Black (trademark), or the like can be used.

The binder serves to anchor the active material particles. One or more kinds of binders can be selected from polyvinylidene fluoride (PVDF), polytetrafluoroethylene (PTFE), fluorine rubber, ethylene propylene diene rubber, styrene butadiene, cellulose-based resins, polyacrylic acid, or the like.

If necessary, a solvent to disperse the positive electrode active material and the conductive material, and a solvent to dissolve the binding agent are added to the positive electrode mixture. For example, an organic solvent such as N-methyl-2-pyrrolidone may be used as the solvent. Activated carbon can also be added to the positive electrode mixture to increase the electrical double layer capacity.

The method of manufacturing positive electrode is not limited to the example described above, but the positive electrode may be manufactured by other methods. For example, the positive electrode mixture may be press-molded, and then dried under vacuum.

Negative Electrode

The negative electrode may be a lithium metal, a lithium alloy, or the like. The negative electrode may be formed by mixing a negative electrode active material capable of intercalating and de-intercalating lithium ions with a binder agent, and further adding an appropriate solvent to the mixture so as to form a paste-like negative electrode mixture, then, the paste-like negative electrode mixture is coated to the surface of a metal foil current collector such as copper, and the resultant is subjected to be dried. The negative electrode may be compressed to increase the electrode density as needed.

As for the negative electrode active material, for example, an organic compound fired body such as natural graphite, artificial graphite, phenolic resins, and the like, and powders of carbon materials such as coke can be used. In this case, a fluorine-containing resin such as PVDF may be used as the negative electrode binder in the same manner as the positive electrode. An organic solvent such as N-methyl-2-pyrrolidone may be used as the solvent for dispersing the active material and the binding agent.

Separator

A separator can be sandwiched between the positive and negative electrodes as needed. The separator separates the positive electrode from the negative electrode and retains the electrolyte. The separator may be a conventional thin-film, such as polyethylene or polypropylene having a number of microscopic pores.

Non-Aqueous Electrolyte

Examples of non-aqueous electrolytes include a non-aqueous electrolytic solution.

As the non-aqueous electrolytic solution, for example, a solution in which a lithium salt as a supporting salt is dissolved in an organic solvent, may be used. As the non-aqueous electrolytic solution, the solution in which a lithium salt is dissolved in an ionic liquid, may be used. The ionic liquid is a salt that includes cations and anions other than lithium ions and is the liquid even at room temperature.

The organic solvent may be a solvent selected from the group consisting of cyclic carbonates such as ethylene carbonate, propylene carbonate, butylene carbonate, and trifluoropropylene carbonate; a chain-like carbonate such as diethyl carbonate, dimethyl carbonate, ethyl methyl carbonate, and dipropyl carbonate; an ether compound such as tetrahydrofuran, 2-methyl tetrahydrofuran, and dimethoxyethane; a sulfur compound such as ethyl methyl sulfone and butane sultone; a phosphorus compound such as triethyl phosphate and trioctyl phosphate; and the like. The organic solvent may be used alone or a mixture of two or more may be used.

As the supporting salt, $LiPF_6$, $LiBF_4$, $LiClO_4$, $LiAsF_6$, $LiN(CF_3SO_2)_2$, and their composite salts may be used. In addition, the non-aqueous electrolytic solution may contain radical scavengers, surfactants, flame retardants, and the like.

As the non-aqueous electrolyte, a solid electrolyte may be used. The solid electrolyte has the property to withstand high voltage. Examples of the solid electrolytes include an inorganic solid electrolyte and an organic solid electrolyte.

Examples of the inorganic solid electrolytes include an oxide-based solid electrolyte, a sulfide-based solid electrolyte, and the like.

The oxide-based solid electrolyte is not particularly limited. For example, the oxide-based solid electrolyte may preferably contain oxygen (O) and preferably exhibit a lithium ion conductivity and an electron insulating property. One or more kinds of oxide-based solid electrolytes can be selected from lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+X}Al_XTi_{2-X}(PO_4)_3$ ($0 \leq X \leq 1$), $Li_{1+X}Al_XGe_{2-X}(PO_4)_3$ ($0 \leq X \leq 1$), $LiTi_2(PO_4)_3$, $Li_{3X}La_{2/3-X}TiO_3$ ($0 \leq X \leq 2/3$), $Li_5La_3Ta_2O_{12}$, $Li_7La_3Zr_2O_{12}$, $Li_6BaLa_2Ta_2O_{12}$, $Li_{3.6}Si_{0.6}P_{0.4}O_4$, and the like.

The sulfide-based solid electrolyte is not particularly limited. For example, the sulfide-based solid electrolyte may preferably contain sulfur (S) and may preferably exhibit a lithium ion conductivity and an electron insulating property. Examples of the sulfide-based solid electrolytes include $Li_2S$—$P_2S_5$, $Li_2S$—$SiS_2$, $LiI$—$Li_2S$—$SiS_2$, $LiI$—$Li_2S$—

$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, and the like.

An inorganic solid electrolyte other than the above may be used. For example, one or more kinds of inorganic solid electrolyte can be selected from $Li_3N$, $LiI$, $Li_3N$—$LiI$—$LiOH$, or the like.

The organic solid electrolyte is not particularly limited in the case of a polymer compound exhibiting ionic conductivity. For example, polyethylene oxide, polypropylene oxide, copolymers thereof, and the like may be used. The organic solid electrolyte may also contain a supporting salt (lithium salt).

Shape and Configuration of the Secondary Battery

The lithium ion secondary battery of the present embodiment described above can be formed into a variety of shapes, such as cylindrical or laminated shape. In any form, when the secondary battery according to the present embodiment uses a non-aqueous electrolytic solution as lithium ion, the positive electrode and the negative electrode can be laminated via a separator to form an electrode body. The obtained electrode body is impregnated with the non-aqueous electrolytic solution. Then, collectors leads or the like are connected between the positive electrode collector and the positive electrode terminal leading to the outside and between the negative electrode collector and the negative electrode terminal leading to the outside, and sealed in a battery case.

As described above, the secondary battery according to the present embodiment is not limited to an embodiment using a non-aqueous electrolytic solution as a non-aqueous electrolyte. The secondary battery of the present embodiment may be, for example, a secondary battery using a solid non-aqueous electrolyte, that is, an all-solid-state battery. In the case of an all-solid-state battery, the configuration other than the positive electrode active material can be changed as necessary.

The secondary battery of the present embodiment is provided with a positive electrode that uses the positive electrode active material of the embodiment as the positive electrode material, and thus excellent thermal stability is achieved. Furthermore, it can be said that thermal stability is excellent when compared with a secondary battery using a positive electrode active material formed by conventional lithium-nickel oxide composite particles.

The secondary battery of the present embodiment has excellent thermal stability as described above, as well as excellent battery capacity, output and cycle characteristics. The secondary battery of the present embodiment can be suitably utilized for small portable electronic devices such as notebook personal computers and cellular phones, that are required to have high levels of these characteristics. In addition, the secondary battery of the present embodiment is excellent in safety, and the secondary battery can be miniaturized and increased in output. In addition, the secondary battery can be suitably used as a power source for a transportation device that is constrained by the space to be mounted because the expensive protection circuit can be simplified.

EXAMPLE

Although the present invention will be described in further detail in the following examples and comparative examples, the present invention is not limited in any way by these examples. In the following examples and comparative examples, each sample of special grade reagent manufactured by Wako Pure Chemical Industries, Ltd. was used to prepare the positive electrode active material, unless otherwise specified.

Example 1

(1) Preparation of Positive Electrode Active Material

A metal composite hydroxide with Ni as the main component, represented by the general formula: $Ni_{0.90}Co_{0.07}Al_{0.03}(OH)_2$, was heat-treated in an air (oxygen concentration: 21% by volume) stream at 600° C. for 5 hours (heat treatment step). Accordingly, a metal composite oxide represented by the general formula: $Ni_{0.90}Co_{0.07}Al_{0.03}O$ as a heat-treated metal composite compound was prepared.

Next, the metal composite oxide obtained in the heat treatment step and lithium hydroxide were weighed so that a ratio Li/Me, which is the ratio of the number of lithium atoms (Li) in the resulting lithium mixture to the number of atoms (Me) of a metal other than lithium, was 1.01, and sufficiently mixed to obtain a lithium mixture (mixing step).

For mixing, a shaker mixer (TURBULA Type T2C manufactured by Willy A. Bachofen (WAB)) was used.

The lithium mixture obtained in the mixing step was fired by increasing the rate of the temperature rise to 750° C. as 3° C./minute in an oxygen (oxygen concentration: 100% by volume) stream and holding the temperature at 750° C. for 6 hours. After firing, the cooling rate was set at about 4° C./minute and cooled to room temperature (firing step).

The positive electrode active material obtained after the firing step was aggregated or slightly sintered. Therefore, the positive electrode active material was pulverized and the average particle size and particle size distribution were adjusted (the pulverizing step).

(2) Evaluation of Positive Electrode Active Material (2-1) Composition

Analysis using an ICP emission spectrometer (ICPE-9000, manufactured by Shimadzu Corporation) confirmed that the obtained positive electrode active material is composed of the lithium metal composite oxide represented by the general formula: $Li_{1.01}Ni_{0.90}Co_{0.07}Al_{0.03}O_2$. When the cross-section of the secondary particles of lithium metal composite oxide contained in the positive electrode active material was analyzed by SEM-EDS, it was confirmed that Al was uniformly dispersed in the secondary particles. The same was true for the following other embodiments.

(2-2) Mean Volume Particle Diameter and Size Distribution

A laser light diffraction scattering particle size analyzer (MicroTrack MT3300EXII, manufactured by MicroTrack Bell, Inc.) was used to measure the mean volume particle diameter (MV) of the positive electrode active material, and d10 and d90 were measured to calculate [(d90−d10)]/mean volume particle diameter] which is an index of the spread of the particle size distribution.

As a result, it was confirmed that the mean volume particle diameter (MV) was 11.4 μm and the index [(d90−d10)/mean volume particle diameter] was 0.93.

(2-3) Specific Surface Area and Tap Density

A specific surface area was measured using a flow-type gas adsorption method specific surface area measurement device (Macsorb (Registered Trademark) model-1200 series, manufactured by MOUNTECH Co. Ltd), and a tapping density was measured using a tapping machine (KRS-406, manufactured by Kuramochi Kagaku Kikai Seisakusyo K.K.). As a result, it was confirmed that the specific surface area was 1.38 $m^2/g$ and the tap density was 2.85 $g/cm^3$.

The specific surface area was measured by BET method using nitrogen gas absorption. The tap density was determined in accordance with JIS Z 2504 (2012) by measuring the bulk density after tapping the sample powder collected in a container for 100 times.

(3) Preparation of Lithium Ion Secondary Battery

The resulting positive electrode active material was used to prepare a 2032-type coin battery.

Figure 1:
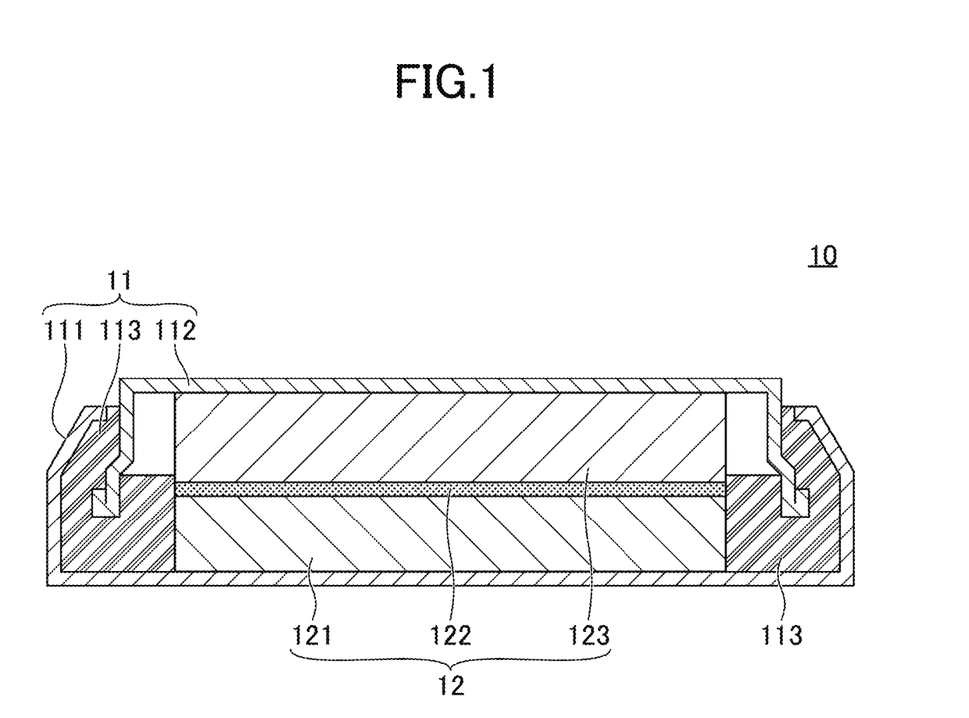
FIG. 1 is a schematic cross-sectional view of a 2032-type coin battery used for a battery evaluation.

A configuration of a prepared coin battery will be described with reference to FIG. 1. FIG. 1 schematically illustrates a cross-sectional structure of a coin cell.

As illustrated in FIG. 1, the coin battery 10 is configured by a case 11 and an electrode 12 that is housed in the case 11.

The case 11 includes a hollow and open-ended positive electrode can 111 and a negative electrode can 112 being disposed in the opening of the positive electrode can 111. When the negative electrode can 112 is disposed in the opening of the positive electrode can 111, a space for accommodating the electrode 12 is formed between the negative electrode can 112 and the positive electrode can 111.

The electrode 12 is configured by a positive electrode 121, a separator 122, and a negative electrode 123, and the electrode 12 is formed by laminating those in the above described order. The electrode 12 is accommodated so that the positive electrode 121 contacts the inner surface of the positive electrode can 111 and the negative electrode 123 contacts the inner surface of the negative electrode can 112.

The case 11 includes a gasket 113 which secures the positive electrode can 111 and the negative electrode can 112 in an electrically insulating condition. The gasket 113 also has a function of sealing the space between the positive electrode can 111 and the negative electrode can 112, and also has a function of sealing the inside and the outside of the case 11 in an air- and liquid-tight manner.

The coin battery 10 was prepared as follows.

First, 52.5 mg of the positive electrode active material, 15 mg of acetylene black, and 7.5 mg of PTEE were mixed and the mixture was press-formed at a pressure of 100 MPa so as to be a diameter of 11 mm and a thickness of 100 µm, and dried in a vacuum dryer at 120° C. for 12 hours to prepare the positive electrode 121.

Next, the positive electrode 121 was used to prepare the 2032-type coin battery 10 in a glove box under an Ar atmosphere with a dew point controlled to −80° C. For the negative electrode 123 of the 2032-type coin battery, a lithium metal having a diameter of 17 mm and a thickness of 1 mm was used. For the electrolyte solution, an equal volume mixture of ethylene carbonate (EC) and diethyl carbonate (DEC) using 1 M of $LiClO_4$ as the supporting electrolyte (manufactured by Toyama Pharmaceutical Co., Ltd.) was used. In addition, a polyethylene porous membrane having a thickness of 25 µm was used for the separator 122.

(4) Evaluation of Lithium Ion Secondary Battery

(4-1) Initial Discharging Capacity

After the 2032-type coin battery was prepared and left for about 24 hours. After the open circuit voltage (OCV) was stabilized, the current density relative to the positive electrode was set at 0.1 $mA/cm^2$. The battery was charged until the cut-off voltage reached to 4.3 V. After 1-hour pause, the discharge capacity when the cut-off voltage was discharged to 3.0 V was measured, and the initial discharge capacity was determined. As a result, it was confirmed that the initial discharge capacity was 214.6 mAh/g. A multichannel voltage/current generator (R6741A, manufactured by Advantest Corporation) was used to measure the initial discharge capacity.

(4-2) Thermal Stability

Thermal stability evaluation of the positive electrode active material was performed by quantifying the amount of oxygen released by heating the positive electrode active material under overcharging conditions. The 2032-type coin battery was prepared and constant current-constant voltage charge (CCCV) was conducted at a rate of 0.2 C up to a cut-off voltage at 4.3V. The coin battery was then dismantled, carefully removed only the positive electrode to avoid shorting, washed with dimethyl carbonate (DMC), and dried. Approximately 2 mg of dried positive electrode active material was weighed and the temperature was raised from room temperature to 450° C. at a rate of 5° C./min using a gas chromatograph mass spectrometer (GCMS-QP2010 plus, manufactured by Shimadzu Corporation). Helium was used as the carrier gas. The generation behavior of oxygen (m/z=32) generated during heating was measured, and the amount of oxygen generated was semi-quantified based on the maximum oxygen generation peak height and peak area obtained. These were used as evaluation indicators of heat stability. The semi-quantitative value of the amount of oxygen generated was calculated by injecting pure oxygen gas into the GCMS using pure oxygen gas as the standard sample and extrapolating the calibration curve obtained from the measurement results. Then, the mass ratio of oxygen gas to helium, which is the carrier gas, was calculated and the amount of oxygen released was obtained. As a result, it was confirmed that the amount of oxygen released was 7.8% by mass.

(4-3) Thickness of Oxygen Release Layer

In order to evaluate the thickness of the oxygen release layer in the positive electrode active material particles during charging, the above-described 2032-type coin battery was charged in the same manner as the thermal stability test, the coin battery was then dismantled, and the positive electrode was carefully removed to avoid shorting. Then, the positive electrode was embedded in a resin, and the positive electrode was made observable in cross-section by focused ion beam processing. Then, the thickness of the oxygen release layer was evaluated by an ELV-2000 Elements View, which is an electron energy loss spectrometer (EELS)

mounted on a scanning transmission electron microscope (STEM) (HD-2300A, manufactured by Hitachi High-Tech Corporation).

In order to evaluate the thickness of the oxygen release layer, lithium metal composite oxide particles in which the secondary particle size is 2/3 or less of the mean volume particle diameter of the positive electrode active material were selected. Then, the thickness of the oxygen release layer was obtained by measuring the spectra of the particles by EELS from the surface of a particle to a center of the particle at constant intervals along the diameter direction, and the oxygen release layer was determined by measuring the thickness from the surface of the particle to the region in which the intensity ratio (1st/2nd) between the peak near 530 eV (1st) and the peak near 545 eV (2nd) at the O-K edge was 0.9 or less. When selecting the lithium metal composite oxide particles for evaluating the thickness of the oxygen release layer, the diameter of the circle adjacent to the lithium metal composite oxide particles was defined as the secondary particle diameter of the lithium metal composite oxide particles.

Figure 2A:
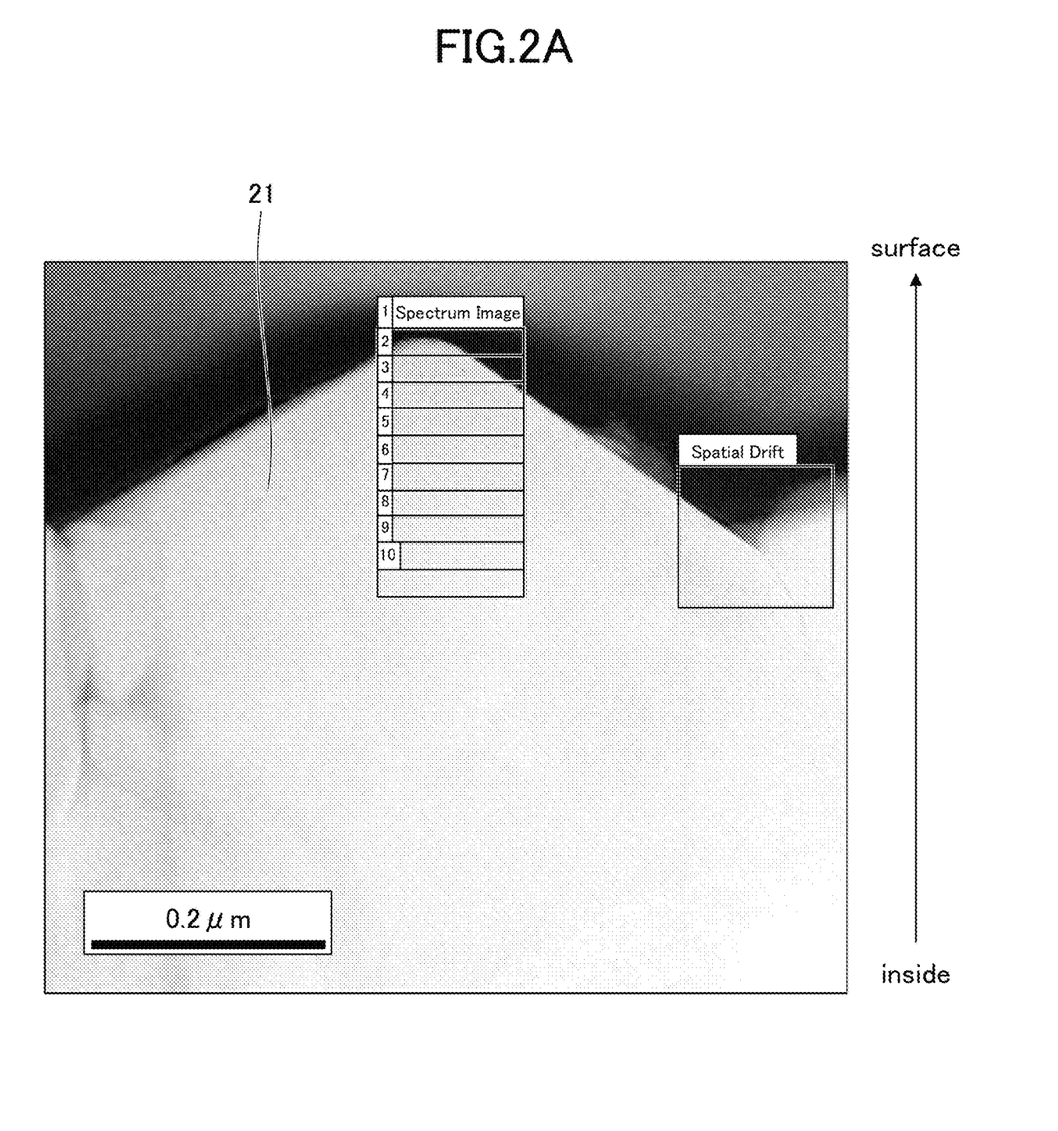
FIG. 2A is a STEM image showing a cross-section of particle of a lithium metal composite hydroxide obtained in Example 1.
Figure 2B:
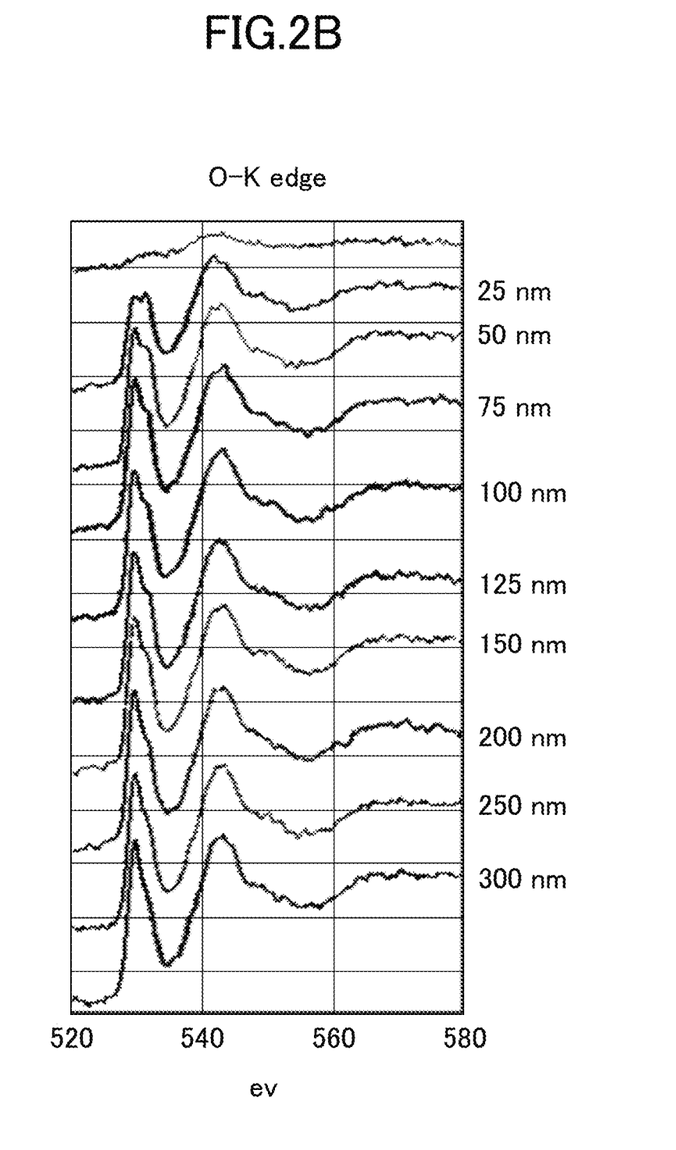
FIG. 2B is an EELS spectrum of a cross-section of particle of a lithium metal composite hydroxide obtained in Example 1.

FIGS. 2A and 2B indicate STEM observational image and EELS profile, respectively.

The result of EELS analysis at each predetermined distance from the surface of the particles 21 in the STEM image indicated in FIG. 2A is indicated in FIG. 2B. Note that a value in FIG. 2B refers to a distance from the particle surface, and the value indicates the EELS profile at each location.

Based on the profile of EELS indicated in FIG. 2B, the area where the peak intensity ratio is 0.9 or less was determined as an oxygen release layer, and the thickness of the oxygen release layer was determined. As a result, the thickness of the oxygen release layer was 35 nm.

The results are summarized in Table 1.

Example 2

The positive electrode active material and the secondary battery were obtained in the same manner as Example 1, except that the firing temperature was set to 720° C. so that the specific surface area became 1.89 m²/g, and the evaluation was performed. The results are indicated in Table 1.

Example 3

The positive electrode active material and the secondary battery were obtained in the same manner as Example 1, except that the firing temperature was set to 780° C. so that the specific surface area became 0.80 m²/g, and the evaluation was performed. The results are indicated in Table 1.

Comparative Example 1

The positive electrode active material and the secondary battery were obtained in the same manner as Example 1, except that the firing temperature was set to 700° C. so that the specific surface area became 2.10 m²/g, and the evaluation was performed. The results are indicated in Table 1.

Comparative Example 2

The positive electrode active material and the secondary battery were obtained in the same manner as Example 1, except that the firing temperature was set to 830° C. so that the specific surface area became 0.55 m²/g, and the evaluation was performed. The results are indicated in Table 1.

Figure 3A:
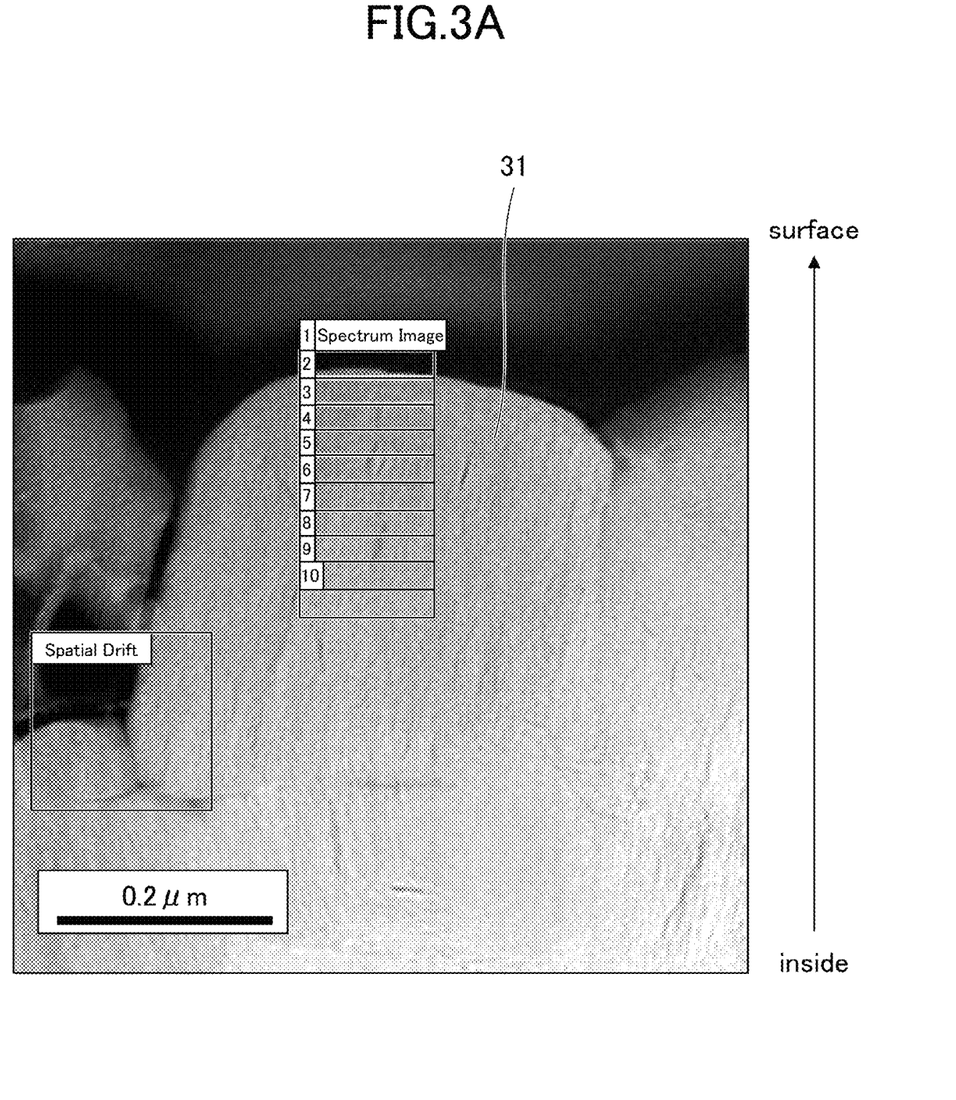
FIG. 3A is a STEM image showing a cross-section of particle of a lithium metal composite hydroxide obtained in Comparative Example 2.
Figure 3B:
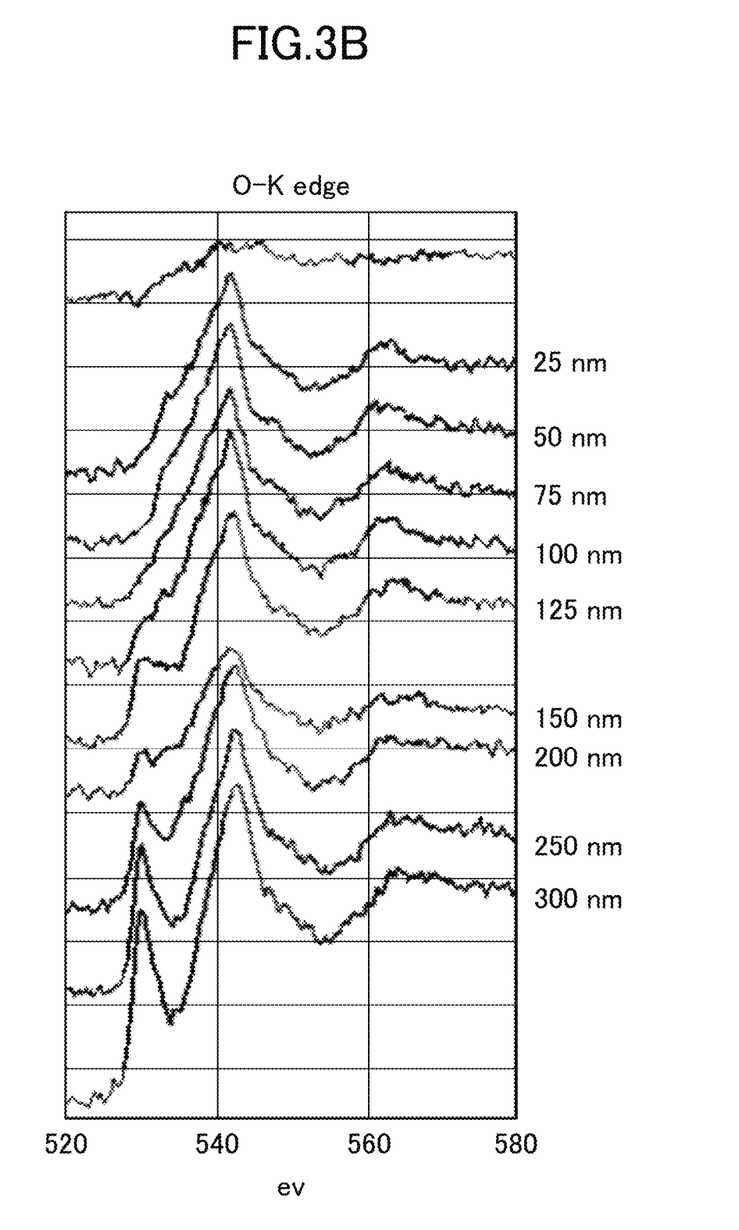
FIG. 3B is an EELS spectrum of a cross-section of particle of a lithium metal composite hydroxide obtained in Comparative Example 2.

The STEM observational images taken when evaluating the thickness of the oxygen release layer and the profile of the EELS are indicated in FIGS. 3A and 3B, respectively. FIG. 3A indicates the observational image of STEM, and FIG. 3B indicates the profile of EELS. In the case of FIGS. 3A and 3B, the results of EELS analysis at a predetermined distance from the surface of the particle 31 in the STEM image indicated in FIG. 3A are indicated in FIG. 3B. Note that a value in FIG. 3B refers to the distance from the particle surface, and the value indicates the EELS profile at each location.

Based on the profile of EELS indicated in FIG. 3B, the area where the peak intensity ratio is 0.9 or less was determined as an oxygen release layer, and the thickness of the oxygen release layer was determined.

TABLE 1

|  | Firing temperature [° C.] | Thickness of oxygen release layer [nm] | Specific surface area [m²/g] | Mean volume diameter (MV) [μm] | Discharge capacity [mAh/g] | Amount of oxygen released [% by mass] | (d90-d10)/mean volume particle diameter[-] | Tap density [g/cm³] |
|---|---|---|---|---|---|---|---|---|
| Example 1 | 750 | 35 | 1.38 | 11.4 | 214.6 | 7.8 | 0.93 | 2.85 |
| Example 2 | 720 | 30 | 1.89 | 11.8 | 220.5 | 5.5 | 0.97 | 2.71 |
| Example 3 | 780 | 175 | 0.80 | 12.3 | 213.8 | 10.1 | 0.95 | 2.49 |
| Comparative Example 1 | 700 | 25 | 2.10 | 11.6 | 215.9 | 17.6 | 0.94 | 2.63 |
| Comparative Example 2 | 830 | 230 | 0.55 | 11.8 | 212.7 | 15.3 | 0.96 | 2.80 |

According to the results shown in Table 1, in Examples 1 to 3, the thicknesses of the oxygen release layer are 200 nm or less, and the specific surface areas are 0.7 m²/g or more and 2.0 m²/g or less. In Examples 1 to 3, the amount oxygen released are 15% by mass or less. Accordingly, it was confirmed that oxygen releasing in the charging state is sufficiently suppressed. In other words, it was confirmed that a positive electrode active material with excellent thermal stability was obtained when the positive electrode active material was used as a lithium ion secondary battery.

As described above, the positive electrode active material for a lithium ion secondary battery, the method of manufacturing the positive electrode active material for a lithium ion secondary battery, and the lithium ion secondary battery were described in the embodiments and the examples, but the present invention is not limited to the above-described embodiments and the examples. Various modifications and variations are possible within the scope of the scope of the invention as defined in the claims.

This application claims priority under Japanese Patent Application No. 2019-033321 filed Feb. 26, 2019, and the entire contents of Japanese Patent Application No. 2019-033321 are incorporated herein by reference.

The invention claimed is:

1. A positive electrode active material for a lithium ion secondary battery containing a lithium metal composite oxide, the lithium metal composite oxide comprising:
   lithium (Li), nickel (Ni), cobalt (Co), and element M in a mass ratio of Li:Ni:Co:M=1+a:1−x−y:x:y (wherein −0.05≤a≤0.50, 0≤x≤0.2, 0≤y≤0.05, and the element M is at least one element selected from Mg, Ca, Al, Si, Fe, Cr, Mn, V, Mo, W, Nb, Ti, Zr, and Ta),
   wherein when a line analysis is performed with Scanning Transmission Electron Microscope-Electron Energy-Loss Spectroscopy STEM EELS from a surface of a particle of the lithium metal composite oxide to a center of the particle in a cross-section of the particle during charging at 4.3 V (vs. Li+/Li), a thickness of an oxygen release layer, in which an intensity ratio (1st/2nd) of a peak near 530 eV (1st) to a peak near 545 eV (2nd) at an O-K edge is 0.9 or less, is 200 nm or less, and
   wherein a specific surface area of the positive electrode active material for a lithium ion secondary battery is 0.7 m$^2$/g or more and 2.0 m$^2$/g or less.

2. The positive electrode active material for a lithium ion secondary battery according to claim 1, wherein a mean volume particle diameter (MV) is 5 μm or more and 20 μm or less in a particle size distribution by a laser diffraction scattering method.

3. The positive electrode active material for a lithium ion secondary battery according to claim 1, wherein the element M is either uniformly distributed inside secondary particles of the lithium metal composite oxide or uniformly coated on surfaces of the secondary particles, or both.

4. A method of manufacturing a positive electrode active material for a lithium ion secondary battery, comprising:
   a heat treatment step of heat-treating a metal composite hydroxide at a temperature of 105° C. or higher and 700° C. or lower to obtain a heat-treated metal composite compound;
   a mixing step of mixing the heat-treated metal composite compound with a lithium compound to form a lithium mixture;
   a firing step of firing the lithium mixture formed in the mixing step at a temperature of 650° C. or higher and 900° C. or lower in an oxidizing atmosphere;
   wherein the metal composite hydroxide contains nickel (Ni), cobalt (Co), and an element M in a mass ratio of Ni:Co:M=1−x−y:x:y (wherein 0≤x≤0.2, 0≤y≤0.05, and the element M is at least one element selected from Mg, Ca, Al, Si, Fe, Cr, Mn, V, Mo, W, Nb, Ti, Zr, and Ta), and
   wherein a specific surface area of the positive electrode active material for a lithium ion secondary battery obtained after the firing step is 0.7 m$^2$/g or more and 2.0 m$^2$/g or less.

5. A lithium ion secondary battery having a positive electrode containing the positive electrode active material for the lithium ion secondary battery of claim 1.

6. A lithium ion secondary battery having a positive electrode containing the positive electrode active material for the lithium ion secondary battery of claim 2.

7. A lithium ion secondary battery having a positive electrode containing the positive electrode active material for the lithium ion secondary battery of claim 3.

8. The positive electrode active material for a lithium ion secondary battery according to claim 1, wherein the positive electrode active material has a mean volume particle diameter (MV) that is 11.4 μm or more and 20 μm or less in a particle size distribution obtained by a laser diffraction scattering method.

9. The method according to claim 4, wherein the heat treatment step is performed at a temperature of 600° C. for 5 hours,
   the firing step is performed by increasing a rate of temperature rise to 750° C. as 3° C./minute in stream that has an oxygen concentration of 100% by volume and holding the temperature at 750° C. for 6 hours, and
   the firing step also includes cooling, after holding the temperature at 750° C. for 6 hours, at a cooling rate at 4° C./minute to room temperature.

* * * * *